United States Patent
Chelba et al.

(10) Patent No.: US 7,860,314 B2
(45) Date of Patent: Dec. 28, 2010

(54) ADAPTATION OF EXPONENTIAL MODELS

(75) Inventors: Ciprian I. Chelba, Seattle, WA (US);
Alejandro Acero, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1341 days.

(21) Appl. No.: 10/977,871

(22) Filed: Oct. 29, 2004

(65) Prior Publication Data

US 2006/0018541 A1   Jan. 26, 2006

Related U.S. Application Data

(60) Provisional application No. 60/590,041, filed on Jul. 21, 2004.

(51) Int. Cl.
*G06K 9/00* (2006.01)
(52) U.S. Cl. .................. 382/181; 382/155; 382/160; 382/190; 382/220; 704/256
(58) Field of Classification Search ............... 382/228, 382/181, 155–161, 190, 201–203, 220; 704/256
See application file for complete search history.

(56) References Cited

U.S. PATENT DOCUMENTS

| | | | | |
|---|---|---|---|---|
| 5,778,397 A | 7/1998 | Kupiec et al. | ............... | 715/500 |
| 5,794,177 A | 8/1998 | Carus et al. | ............... | 704/9 |
| 5,805,771 A * | 9/1998 | Muthusamy et al. | ......... | 704/232 |
| 5,890,103 A | 3/1999 | Carus | ............... | 704/9 |
| 6,167,369 A | 12/2000 | Schulze | ............... | 704/9 |
| 6,490,549 B1 | 12/2002 | Ulicny et al. | ............... | 704/10 |
| 6,760,695 B1 | 7/2004 | Kuno et al. | ............... | 704/9 |
| 6,901,399 B1 | 5/2005 | Corston et al. | ............... | 707/6 |
| 2002/0022956 A1 | 2/2002 | Ukrainczyk et al. | ............ | 704/9 |
| 2002/0188421 A1* | 12/2002 | Tanigaki et al. | ............ | 702/181 |
| 2006/0020448 A1 | 1/2006 | Chelba et al. | | |

OTHER PUBLICATIONS

Lafferty et al., "Conditional Random Fields: Probabilistic Models for Sementing and Labeling Sequence Data," 2001, In Proc. $18^{th}$ International conference on Machine Learning, pp. 281-289.*
Goodman, "Exponential Priors for Maximum Entropy Models," May 2-7, 2004, HLT-NAACL 2004, pp. 305-312.*

(Continued)

*Primary Examiner*—Samir A Ahmed
*Assistant Examiner*—John W Lee
(74) *Attorney, Agent, or Firm*—Theodore M. Magee; Westman, Champlin & Kelly, P.A.

(57) ABSTRACT

A method and apparatus are provided for adapting an exponential probability model. In a first stage, a general-purpose background model is built from background data by determining a set of model parameters for the probability model based on a set of background data. The background model parameters are then used to define a prior model for the parameters of an adapted probability model that is adapted and more specific to an adaptation data set of interest. The adaptation data set is generally of much smaller size than the background data set. A second set of model parameters are then determined for the adapted probability model based on the set of adaptation data and the prior model.

10 Claims, 5 Drawing Sheets

OTHER PUBLICATIONS

Lafferty et al., "Conditional Random Fields: Probabilisitic Models for Segmenting and Labeling Sequence Data." 2001, Morgan Kauffman, pp. 282-289.*

Lafferty et al., "Conditional Random Fields: Probabilistic Models for Sementing and Labeling Sequence Data," 2001, in Proc. 18th International conference on Machine Learning, pp. 281-289.*

Doug Beeferman, "Text Segmentation Using Exponential Models," 1997, Proceedings of the Second Conference on Empirical Models in Natural Language Processing.

A.L. Berger et al., 1996, "A Maximum Entropy Approach to Natural Language Processing," Computational Linguistics, 22(1):39-72, March.

Eric Brill, 1994, "Some Advances in Transformation-Based Part of Speech Tagging," In National Conference on Artificial Intelligence, pp. 722-727.

Stanley F. Chen and Ronald Rosenfeld, 2000, "A Survey of Smoothing Techniques for Maximum Entropy Models," IEEE Transactions on Speech and Audio Processing, 8(1):37-50.

Michael Collins, 2002, "Discriminative Training Methods for Hidden Markov Models: Theory and Experiments with Perceptron Algorithms," In Proceedings of the Conference on Empirical Methods in Natural Language Processing, pp. 1-8, University of Pennsylvania, Philadelphia, PA, July, ACL.

Joshua Goodman, 2004, "Exponential Priors for Maximum Entropy Models," In Daniel Marcu Susan Dumais and Salim Roukos, editors, HLT-NAACL 2004: Main Proceedings, pp. 305-312, Boston, Massachusetts, USA, May 2-7, Association for Computational Linguistics.

Ji-Hwan Kim et al., 2004, "Automatic Capitalization Generation for Speech Input," Computer Speech and Language, 18(1): 67-90, January.

John Lafferty et al., 2001, "Conditional Random Fields: Probabilistic Models for Segmenting and Labeling Sequence Data," In Proc. 18$^{th}$ International Conf. on Machine Learning; pp. 282-289, Morgan Kauffman, San Francisco, CA.

L. Lita, A. Ittycheriah, S. Roukos, and N. Kambhatla, 2003, "tRuEcasIng," In Proceedings of ACL, pp. 152-159, Sapporo, Japan.

Doug B. Paul et al., 1992, "The Design for the Wall Street Journal-Based CSR Corpus," In Proceedings of the DARPA SLS Workshop, February.

S. Della et al., 1995, "Inducing Features of Random Fields," Technical Report SMU-CS-95-144, School of Computer Science, Carnegie Mellon University, Pittsburgh, PA.

Adwait Ratnaparkhi, 1996, "A Maximum Entropy Model for Part-of-Speech Tagging," In Eric Brill and Kenneth Church, editors, Proceedings of the Conference on Empirical Methods in Natural Language Processing, pp. 133-142, Association for Computational Linguistics, Somerset, New Jersey.

Notice of First Office Action for Application No. 200510082351.2 filed Jun. 21, 2005.

Notice of a Second Office Action for related Chinese Patent Application 200510082351.2 dated Mar. 1, 2010.

Notice of a Third Office Action for related Chinese Patent Application 200510082351.2, dated Jun. 2, 2010.

Notice of a First Official Communication for related European Patent Application 05 106 512.6-2221, dated Aug. 30, 2006.

* cited by examiner

ADAPTATION OF EXPONENTIAL MODELS

The present application claims priority from U.S. provisional application 60/590,041 filed on Jul. 21, 2004.

BACKGROUND OF THE INVENTION

The present invention relates to exponential models. In particular, the present invention relates to adapting exponential models to specific data.

Exponential probability models include models such as Maximum Entropy models and Conditional Random Field (CRF) models. In Maximum Entropy models, it is common to have a set of features, which are indicator functions that have a value of one when the feature is present in a set of data and a value of zero when the feature is not present. A weighted sum of the features is exponentiated and normalized to form the maximum entropy probability.

Typically, the weights for the Maximum Entropy model are trained on a large set of training data. To avoid overtraining the weights (model), at least one technique of the prior art applies smoothing to preserve probability mass for unseen data.

Although using a large set of training data makes the Maximum Entropy model useful across a large set of input data, it also produces a Maximum Entropy model that is not optimized for specific types of input data.

Thus, it would be desirable to be able to adapt Maximum Entropy models that have been trained on a large set of training data to specific sets of expected data so that they may perform better with the expected data.

SUMMARY OF THE INVENTION

A method and apparatus are provided for adapting an exponential probability model. In a first stage, a general-purpose background model is built from background data by determining a set of model parameters for the probability model based on a set of background data. The background model parameters are then used to define a prior model for the parameters of an adapted probability model that is adapted, and more specific, to an adaptation data set of interest. The adaptation data set is generally of much smaller size than the background data set. A second set of model parameters are then determined for the adapted probability model based on the set of adaptation data and the prior model.

DETAILED DESCRIPTION OF ILLUSTRATIVE EMBODIMENTS

Figure 1:
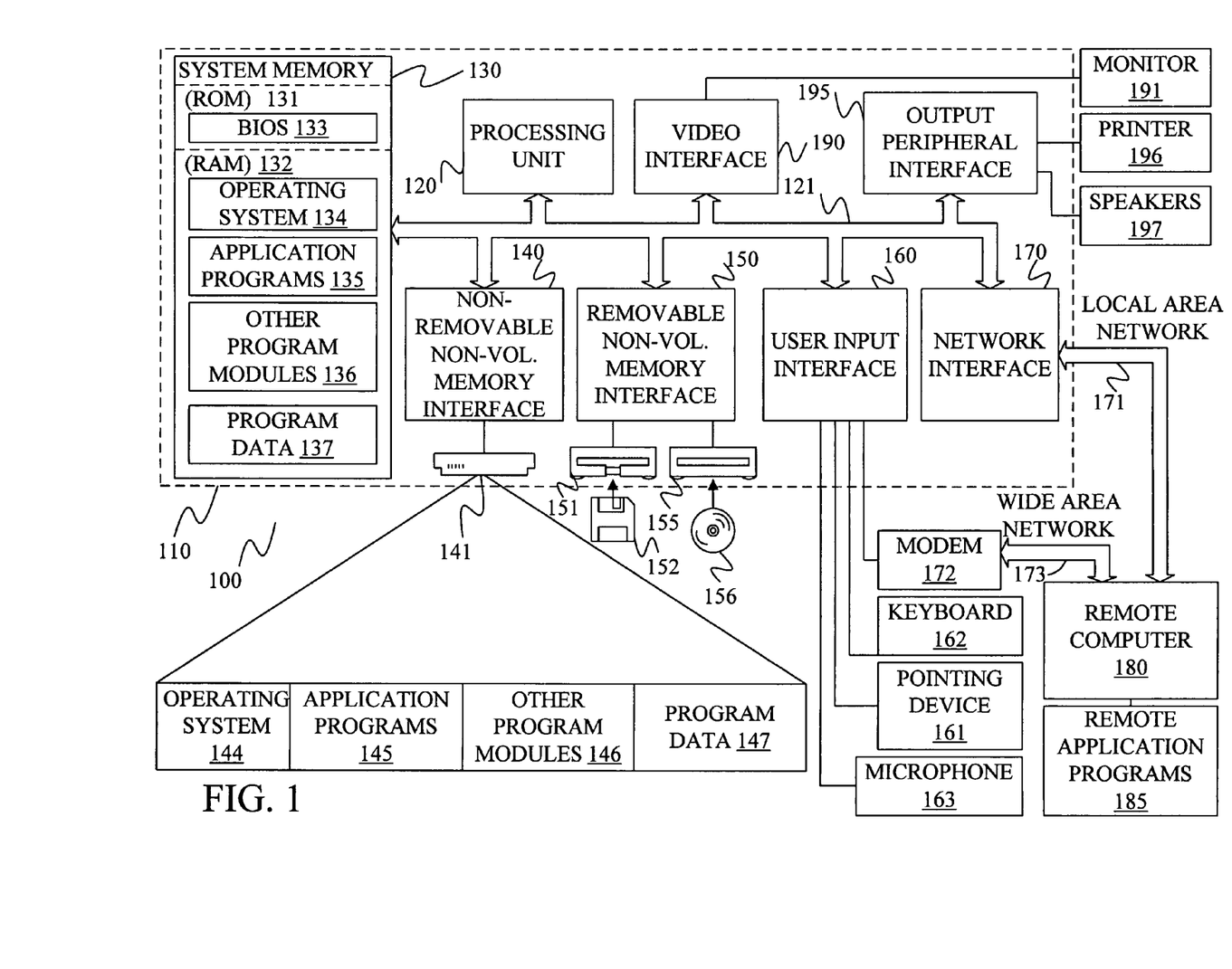
FIG. 1 is a block diagram of one computing environment in which the present invention may be practiced.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention is designed to be practiced in distributed computing environments where tasks are performed by remote processing devices that are linked through a communications network. In a distributed computing environment, program modules are located in both local and remote computer storage media including memory storage devices.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other storage medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 is operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
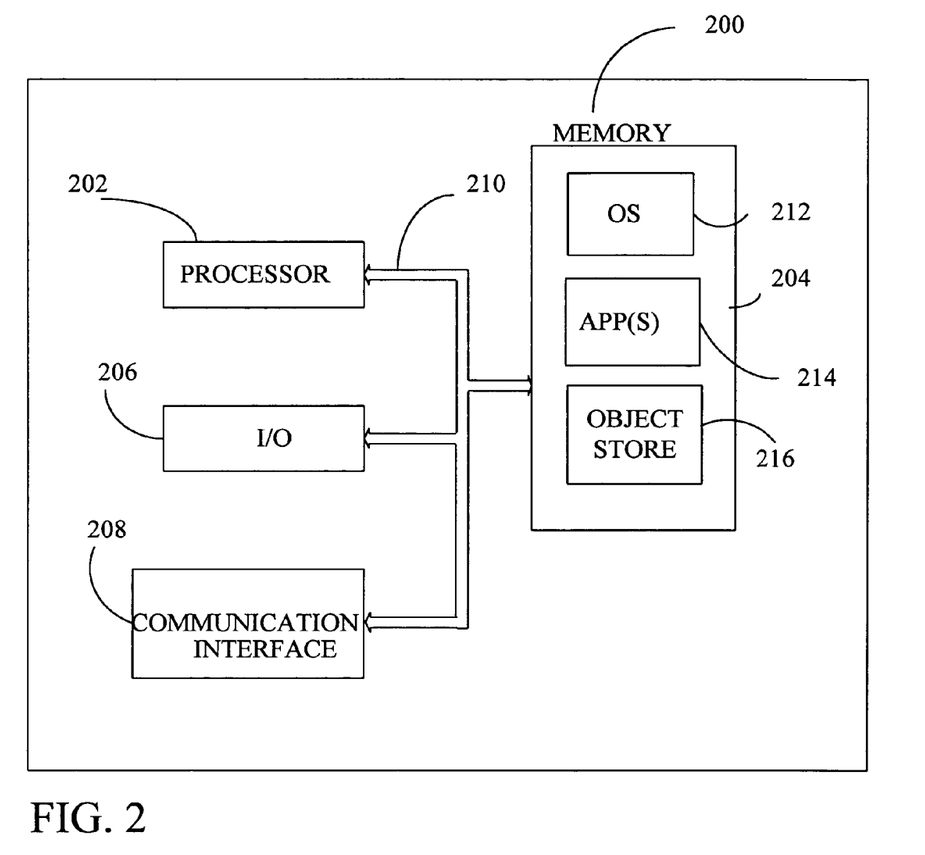
FIG. 2 is a block diagram of an alternative computing environment in which the present invention may be practiced.

FIG. 2 is a block diagram of a mobile device 200, which is an exemplary computing environment. Mobile device 200 includes a microprocessor 202, memory 204, input/output (I/O) components 206, and a communication interface 208 for communicating with remote computers or other mobile devices. In one embodiment, the afore-mentioned components are coupled for communication with one another over a suitable bus 210.

Memory 204 is implemented as non-volatile electronic memory such as random access memory (RAM) with a battery back-up module (not shown) such that information stored in memory 204 is not lost when the general power to mobile device 200 is shut down. A portion of memory 204 is preferably allocated as addressable memory for program execution, while another portion of memory 204 is preferably used for storage, such as to simulate storage on a disk drive.

Memory 204 includes an operating system 212, application programs 214 as well as an object store 216. During operation, operating system 212 is preferably executed by processor 202 from memory 204. Operating system 212, in one preferred embodiment, is a WINDOWS® CE brand operating system commercially available from Microsoft Corporation. Operating system 212 is preferably designed for mobile devices, and implements database features that can be utilized by applications 214 through a set of exposed application programming interfaces and methods. The objects in object store 216 are maintained by applications 214 and operating system 212, at least partially in response to calls to the exposed application programming interfaces and methods.

Communication interface 208 represents numerous devices and technologies that allow mobile device 200 to send and receive information. The devices include wired and wireless modems, satellite receivers and broadcast tuners to name a few. Mobile device 200 can also be directly connected to a computer to exchange data therewith. In such cases, communication interface 208 can be an infrared transceiver or a serial or parallel communication connection, all of which are capable of transmitting streaming information.

Input/output components 206 include a variety of input devices such as a touch-sensitive screen, buttons, rollers, and a microphone as well as a variety of output devices including an audio generator, a vibrating device, and a display. The devices listed above are by way of example and need not all be present on mobile device 200. In addition, other input/output devices may be attached to or found with mobile device 200 within the scope of the present invention.

The present invention approaches the problem of identifying capitalization for a sentence as a sequence labeling problem in which a sequence of words is assigned a sequence of capitalization tags that indicate the type or form of capitalization to be applied to the words. Under one embodiment, the possible capitalization tags include:

LOC: lowercase
CAP: capitalized
MXC: mixed case; no further guess is made as to the capitalization of such words. A possibility is to use the most frequent one encountered in the training data.
AUC: all upper case
PNC: punctuation.

Based on this approach, one embodiment of the present invention constructs a Markov Model that assigns a probability p(T|W) to any possible tag sequence $T=t_1 \ldots t_n=T_1^n$ for a given word sequence $W=w_1 \ldots w_n$. Under one embodiment, this probability is determined as:

$$P(T|W) = \prod_{i=1}^{n} P(t_i | x_i(W, T_1^{i-1})) \quad \text{EQ. 1}$$

where $t_i$ is the tag corresponding to word i and $x_i(W,T_1^{i-1})$ is the conditioning or context information at position i in the word sequence on which the probability model is built.

Under one embodiment, the context information is information that can be determined from the preceding word, the current word, and the next word in the word sequence as well as the preceding two capitalization tags. The information provided by these values includes not only the words and tags themselves, but portions of each of the words, and bigrams and trigrams formed from the words and bigrams formed from the tags.

Under one embodiment of the invention, the probability $P(T_i|x_i(W,T_1^{i-1}))$ is modeled using a Maximum Entropy model. This model uses features, which are indicator functions of the type:

$$f(y, \underline{x}) = \begin{cases} 1, & \text{if } y = \text{feature's tag and } \underline{x} = \text{feature's context} \\ 0, & \text{otherwise} \end{cases} \quad \text{EQ. 2}$$

where y is used in place of $t_i$, and x represents the context information $x_i(W,T_1^{i-1})$. Although the features are shown as having values of 0 or 1, in other embodiments, the feature values may be any real values.

Assuming a set of features $\mathcal{F}$ whose cardinality is F the probability assignment is made according to:

$$p_\Lambda(y | \underline{x}) = Z^{-1}(\underline{x}, \Lambda) \cdot \exp\left[\sum_{i=1}^{F} \lambda_i f_i(\underline{x}, y)\right] \quad \text{EQ. 3}$$

$$Z(\underline{x}, \Lambda) = \sum_y \exp\left[\sum_{i=1}^{F} \lambda_i f_i(\underline{x}, y)\right] \quad \text{EQ. 4}$$

where $\Lambda=\{\lambda_1 \ldots \lambda_F\} \in R^F$ is the set of real-valued model parameters. Thus, the Maximum Entropy model is calculated by taking the exponent of a weighted sum of indicator functions.

Figure 3:
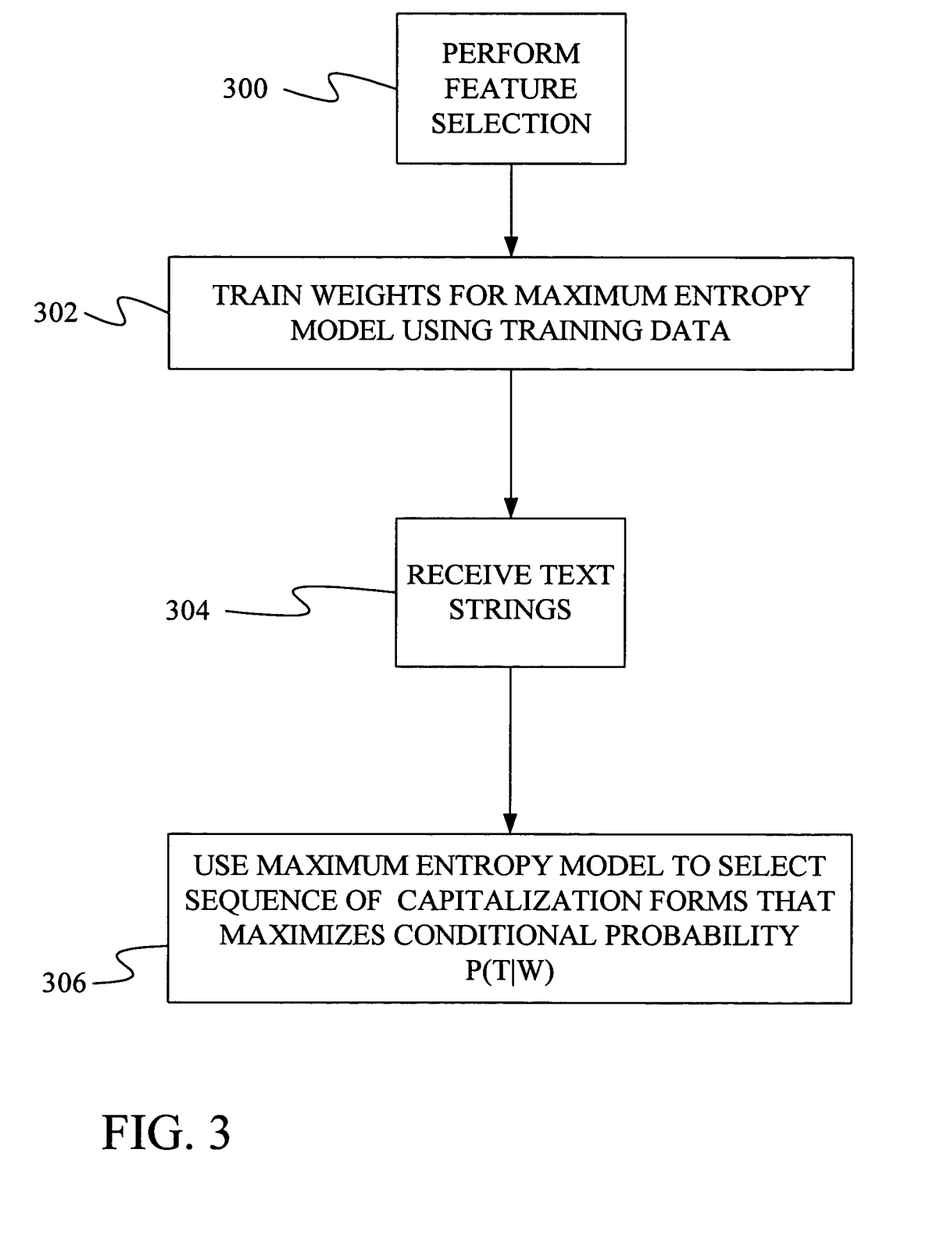
FIG. 3 is a flow diagram of a method of identifying capitalization for words in a string of text.

FIG. 3 provides a flow diagram of a method for training and using Maximum Entropy probabilities to identify capitalization for a string of text. In step 300, features are selected from a predefined set of features. This selection is performed using a simple count cutoff algorithm that counts the number of occurrences of each feature in a training corpus. Those features whose count is less than a pre-specified threshold are discarded. This reduces the number of parameters that must be trained. Optionally, it is possible to keep all features in the predefined set by setting the threshold to zero.

At step 302, the weights for the Maximum Entropy model are estimated. Under one embodiment, the model parameters $\Lambda=\{\lambda_1 \ldots \lambda_F\} \in R^F$ are estimated such that the model assigns maximum log-likelihood to a set of training data subject to a Gaussian prior centered at zero that ensures smoothing. In other embodiments, different prior distributions can be used for smoothing, such as an exponential prior. Under one embodiment that uses Improved Iterative Scaling to determine the model parameters, this results in an update equation for each $\lambda$ of:

$$\lambda_i^{(t+1)} = \lambda_i^{(t)} + \delta_i \quad \text{EQ. 5}$$

where $\delta_i$ satisfies:

$$\sum_{\underline{x},y} \tilde{p}(\underline{x}, y) f_i(\underline{x}, y) - \frac{\lambda_i}{\sigma_i^2} = \quad \text{EQ. 6}$$

$$\frac{\delta_i}{\sigma_i^2} + \sum_{\underline{x},y} \tilde{p}(\underline{x}) p_\Lambda(y | \underline{x}) f_i(\underline{x}, y) \exp(\delta_i f^\#(\underline{x}, y))$$

where $f^\#(x, y)$ is the sum of the features that trigger for an event x, y, $f_i(x, y)$ is an indicator function from equation 2 and $p_\Lambda(y|x)$ is determined using equations 3 and 4. In Equation 6, $\tilde{p}(x, y)$ is the relative frequency of the co-occurrence of context x and the output or tag y in the training data, $\tilde{p}(x)$ is the relative frequency of the context in the training data and $\sigma_i^2$ is the variance of the zero mean Gaussian prior.

Although the update equations are shown for the Improved Iterative Scaling estimation technique, other techniques may be used to estimate the model parameters by maximizing the log-likelihood such as Generalized Iterative Scaling, Fast Iterative Scaling, Gradient Ascent variants, or any other known estimation technique.

Once the weights of the Maximum Entropy model have been trained, strings of text that are to be capitalized are received at step 304. At step 306, the trained maximum entropy weights are used to find a sequence of capitalization forms for the sequence of words in a string of text that maximizes the conditional probability P(T|W). The sequence of capitalization that maximizes this probability is selected as the capitalization for the string of text.

The search for the sequence of tags that maximizes the conditional probability may be performed using any acceptable searching technique. For example, a Viterbi search may be performed by representing the possible capitalization forms for each word in a string as a trellis. At each word, a score is determined for each possible path into each capitalization form from the capitalization forms of the preceding word. When calculating these scores, the past capitalization forms used in the maximum entropy features are taken from the capitalization forms found along the path. The path that provides the highest score into a capitalization form is selected as the path for that capitalization form. The score for the path is then updated using the probability determined for that capitalization form of the current word. At the last word, the path with the highest score is selected, and the sequence of capitalization forms along that path is used as the capitalization forms for the sequence of words.

Although a Maximum Entropy model is used above, other models that use an exponential probability may be used to determine the conditional probability under other embodiments of the present invention. For example, Conditional Random Fields (CRF) may be used.

Figure 4:
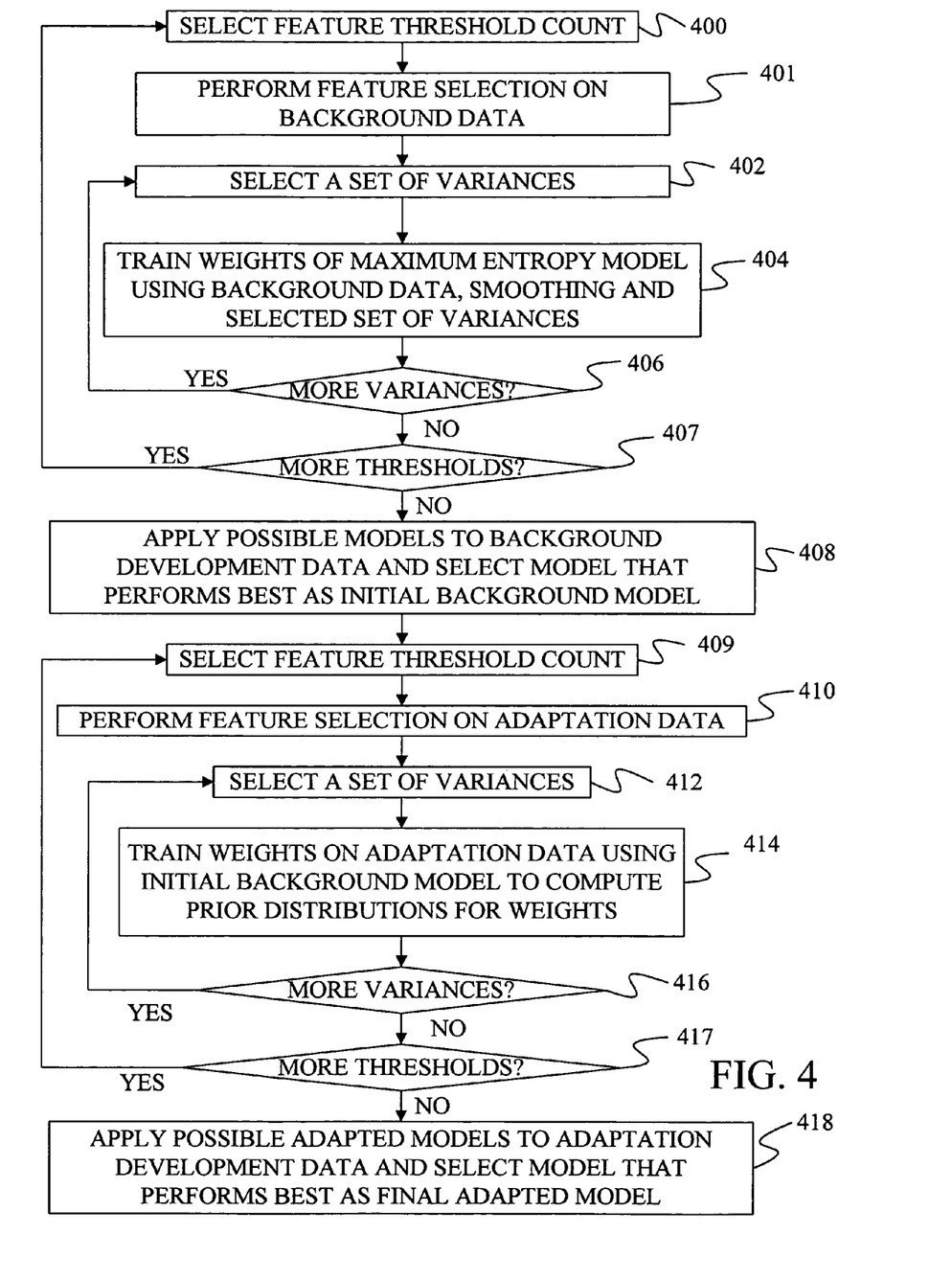
FIG. 4 is a flow diagram of a method for adapting a maximum entropy model under one embodiment of the present invention.
Figure 5:
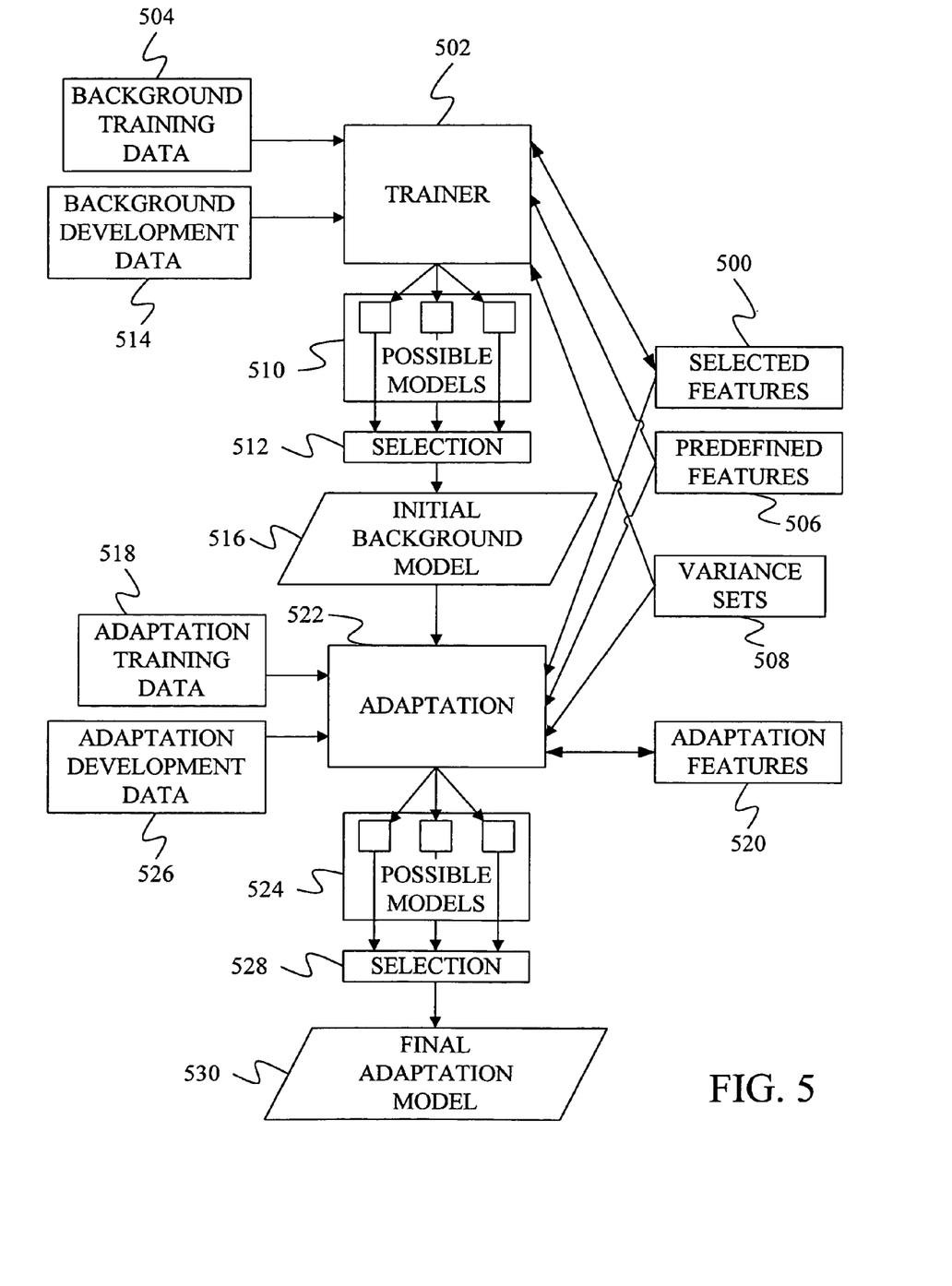
FIG. 5 is a block diagram of elements used in adapting a maximum entropy model under one embodiment of the present invention.

Under some embodiments of the present invention, a Maximum Entropy model is trained on a large set of background data and then adapted to a smaller set of specific data so that the model performs well with data of the type found in the smaller set of specific data. FIG. 4 provides a flow diagram of a method for adapting a Maximum Entropy model under the present invention and FIG. 5 provides a block diagram of elements used in adapting a Maximum Entropy model.

In step 400, a feature threshold count is selected. At step 401, this threshold count is used by a trainer 502 to select a set of features 500 based on the background training data 504. Under one embodiment, this involves counting the number of times each of a set of predefined features 506 occurs in background training data 504 and selecting only those features that occur more than the number of times represented by the threshold count.

At step 402, a variance for a prior Gaussian model is selected for each weight from a set of possible variances 508. At step 404, trainer 502 trains the weights of the maximum entropy model trained based on background training data 504 while using smoothing and the selected variances through Equations 5 and 6 identified above.

Note that in equations 5 and 6 above, an Improved Iterative Scaling technique was used to estimate the weights that maximize the log-likelihood. Step 404 is not limited to this estimation technique and other estimation techniques such as Generalized Iterative Scaling, Fast Iterative Scaling, Gradient Ascent, or any other estimation technique may be used to identify the weights.

At step 406, trainer 502 determines if there are more variances in the set of variances 508 that should be evaluated. Under the present invention, multiple sets of weights are trained using a different set of variances for each set of weights. If there are more sets of variances that need to be evaluated at step 406, the process returns to step 402 and a new set of variances is selected before a set of weights is trained for that set of variances at step 404. Steps 402, 404 and 406 are repeated until there are no more sets of variances to be evaluated.

When there are no further sets of variances to be evaluated at step 406, the process determines if there are more threshold counts to be evaluated at step 407. If there are more threshold counts, a new threshold count is selected at step 400 and steps 401, 402, 404, and 406 are repeated for the new threshold count. By using different threshold counts, different features sets are used to construct different maximum entropy models.

When there are no further threshold counts to be evaluated at step 407, a set of possible models 510 has been produced, each with its own set of weights. A selection unit 512 then selects the model that provides the best capitalization accuracy on background development data 514 at step 408. The selected model forms an initial background model 516.

At step 409, feature threshold count is again selected and at step 410, the feature selection process is repeated for a set of adaptation training data 518 to produce adaptation features 520. This can result in the same set, although generally it will produce a super-set of features from those selected at step 400.

At step 412, a set of variances for a prior model is once again selected from the collection of variances 508. Using the selected set of variances, adaptation training data 518, and the weights of initial background model 516, an adaptation unit 522 trains a set of adapted weights at step 414. Under one embodiment, a prior distribution for the weights is modeled as a Gaussian distribution such that the log-likelihood of the adaptation training data becomes:

$$L(\Lambda) = \sum_{\underline{x},y} \tilde{p}(\underline{x},y) \log p_\Lambda(y|\underline{x}) - \sum_{i=1}^{F} \frac{(\lambda_i - \lambda_i^0)^2}{2\sigma_i^2} + const(\Lambda) \quad \text{EQ. 7}$$

where the summation in the second term on the right hand side of Equation 7, $$\left( \sum_{i=1}^{F} \frac{(\lambda_i - \lambda_i^0)^2}{2\sigma_i^2} \right),$$

represents the probability of the weights given Gaussian priors for the weights that have means equal to the weights in initial background model 516 and variances that were selected in step 412. The summation of the second term is taken over all of the features formed from the union of selected features 500 formed through the feature selection process at step 400 and adaptation features 520 formed through the feature selection process at step 410. For features that were not present in the background data, the prior mean is set to zero. In other embodiments, steps 409 and 410 are not performed and the same features that are identified from the background data are used in Equation 7 for adapting the model.

Using this prior model and an Improved Iterative Scaling technique, the update equations for training the adapted weights at step 414 become:

$$\lambda_i^{t+1} = \lambda_i^t + \delta_i \quad \text{EQ. 8}$$

where $\delta_i$ satisfies:

$$\sum_{\underline{x},y} \tilde{p}(\underline{x},y) f_i(\underline{x},y) - \frac{(\lambda_i - \lambda_i^0)}{\sigma_i^2} = \quad \text{EQ. 9}$$

$$\frac{\delta_i}{\sigma_i^2} + \sum_{\underline{x},y} \tilde{p}(\underline{x}) p_\Lambda(y|\underline{x}) f_i(\underline{x},y) \exp(\delta_i f^\#(\underline{x},y))$$

where p̃(x, y) is the relative frequency of the co-occurrence of context x and the output or tag y in adaptation training data 518, $f_i(x, y)$ is an indicator function from equation 2 and $p_\Lambda(y|x)$ is determined using equations 3 and 4 and p̃(x) is the relative frequency of the context in adaptation training data 518.

The effect of the prior probability is to keep the model parameters $\lambda_i$ close to the model parameters generated from the background data. The cost of moving away from the initial model parameters is specified by the magnitude of the variance $\sigma_i$, such that a small variance will keep the model parameters close to the initial model parameters and a large variance will make the regularized log-likelihood insensitive to the initial model parameters, allowing the model parameters to better conform to the adaptation data.

In situations where a feature is not present in adaptation training data 518 but is present in background training data 504, the weight for the feature is still updated during step 414.

At step 416, the method determines if there are more sets of variances to be evaluated. If there are more sets of variances to be evaluated, the process returns to step 412 and a new set of variances is selected. Another set of weights is then adapted at step 414 using the new sets of variances and the weights of initial background model 516. Steps 412, 414, and 416 are repeated until there are no further variances to be evaluated.

When there are no further sets of variances to be evaluated at step 416, the process determines if there are further feature threshold counts to be evaluated at step 417. If there are further feature counts, a new feature count is selected at step 409 and steps 410, 412, 414 and 416 are repeated for the new threshold count.

Steps 412, 414, and 416 produce a set of possible adapted models 524. At step 418 the adapted model that provides the highest log-likelihood for a set of adaptation development data 526 using Equation 7, is selected by a selection unit 528 as the final adapted model 530.

Although in the description above, a Gaussian prior distribution was used in the log likelihood determinations of Equation 7, those skilled in the art will recognize that other forms of prior distributions may be used. In particular, an exponential prior probability may be used in place of the Gaussian prior.

Although the adaptation algorithm has been discussed above with reference to capitalization, it may be applied to any classification problem that utilizes a Maximum Entropy model, such as text classification for spam filtering and language modeling.

By allowing the model weights to be adapted to a small set of adaptation data, it is possible to train initial model parameters for the Maximum Entropy model and place those model parameters in a product that is shipped or transmitted to a customer. The customer can then adapt the Maximum Entropy model on specific data that is in the customer's system. For example, the customer may have examples of specific types of text such as scientific journal articles. Using these articles in the present adaptation algorithm, the customer is able to adapt the Maximum Entropy model parameters so they operate better with scientific journal articles.

Although the present invention has been described with reference to particular embodiments, workers skilled in the art will recognize that changes may be made in form and detail without departing from the spirit and scope of the invention.

What is claimed is:

1. A non-transitory computer storage medium having computer-executable instructions that when executed by a processor cause the processor to perform steps comprising:

for each of a first set of feature threshold counts, performing steps comprising:
  selecting a set of features from background data, where each feature in the set appears in the background data more than a number of times represented by the feature threshold count;
  for each of a first set of variances of a prior model, performing steps comprising:
    training a set of weights comprising a separate weight for each feature in the selected set of features from the background data such that the set of weights maximizes the likelihood of the set of background data using update equations for the weights that are based on an exponential probability model and relative frequencies in the background data of co-occurrences of contexts and capitalization tags, wherein each trained set of weights and respective selected set of features from the background data represent a separate model;
applying each separate model to a set of background development data and selecting the model with the best accuracy as an initial model having an initial set of weights and an initial set of features from the background data;
for each of a second set of feature threshold counts performing steps comprising:
  selecting a set of features from adaptation data, where each feature in the set of features appears in the adaptation data more than a number of times represented by the feature threshold count from the second set of feature threshold counts, wherein the adaptation data is smaller than the background data;
  for each of a second set of variances of the prior model, performing steps comprising:
    the processor determining an adapted set of weights comprising a separate weight for each feature in a union of the selected set of features from the adaptation data and the initial set of features from the background data such that the set of weights maximize the likelihood of a set of adaptation data, and such that a weight for a feature that is present in the initial set of features from the background data but that is not present in the selected set of features from the adaptation data is updated when determining an adapted set of weights, wherein the likelihood of the set of adaptation data is based on:
      a second exponential probability model;
      a prior model for the set of weights that comprises means with values equal to the initial set of weights for features that are present in the initial set of features from the background data and means with values equal to zero for features that are not present in the initial set of features from the background data but that are present in the set of features from the adaptation data; and
      relative frequencies in the adaptation data of co-occurrences of contexts and capitalization tags;
  selecting a set of adapted weights as a final adapted model be determining which set of adapted weights provides the highest likelihood for a asset of adaptation development data.

2. The computer storage medium of claim 1 wherein the prior model comprises a Gaussian model.

3. The computer storage medium of claim 1 wherein the prior model comprises an exponential model.

4. The computer storage medium of claim 1 wherein the exponential probability model uses a weighted sum of the selected set of features from the background data, wherein each feature in the selected set of features from the background data comprises an indicator function based on a respective capitalization tag and respective context information.

5. The computer storage medium of claim 4 wherein each feature in the union of the selected set of features from the adaptation data and the initial set of features from the background data comprises an indicator function based on a respective capitalization tag and respective context information.

6. A method comprising:
a processor selecting a set of features from a set of background data by selecting features that occur in the set of background data more than a number of times represented by a threshold count for the background data;
the processor determining an initial set of weights that maximize the likelihood of a set of background data, wherein the likelihood is based on an exponential probability model and wherein there is a separate initial weight for each feature in the selected set of features from the background data;
the processor selecting a set of features from a set adaptation data by selecting features that occur in the set of adaptation data more than a number of times represented by a threshold count for the adaptation data;
the processor determining an adapted set of weights that maximize the likelihood of a set of adaptation data, wherein the set of adaptation data is smaller than the set of background data and wherein the likelihood is based on a second exponential probability model and a prior model of a distribution of weights comprising a separate mean for each feature in the union of the set of features from the set of background data and the set of features from the set of adaptation data, wherein each mean for a feature in the set of features from the background data has a value equal to the value of the initial weight for that feature and wherein each mean for a feature that is not in the set of features from the background data but is in the set of features from the adaptation data has a value equal to zero.

7. The method of claim 6 wherein the prior model comprises a Gaussian model.

8. The method of claim 6 wherein the prior model comprises an exponential model.

9. The method of claim 6 wherein the exponential probability model uses a weighted sum of the set of features from the set of background data, wherein each feature in the set of features from the set of background data comprises an indicator function based on a respective capitalization tag and respective context information.

10. The method of claim 9 wherein each feature in the union of the set of features from the set of background data and the set of features from the set of adaptation data comprises an indicator function based on a respective capitalization tag and respective context information.

* * * * *

UNITED STATES PATENT AND TRADEMARK OFFICE
CERTIFICATE OF CORRECTION

PATENT NO. : 7,860,314 B2  
APPLICATION NO. : 10/977871  
DATED : December 28, 2010  
INVENTOR(S) : Ciprian I. Chelba et al.

Page 1 of 1

It is certified that error appears in the above-identified patent and that said Letters Patent is hereby corrected as shown below:

In column 6, line 47, delete "$f^\#(x,y)$" and insert -- $f^\#(\underline{x},y)$ --, therefor.

In column 6, line 48, delete "$x,y,f_i(x,y)$" and insert -- $\underline{x},y,f_i(\underline{x},y)$ --, therefor.

In column 6, line 49, delete "$p_\Lambda(y|x)$" and insert -- $p_\Lambda(y|\underline{x})$ --, therefor.

In column 6, line 50, delete "$\tilde{p}(x,y)$" and insert -- $\tilde{p}(\underline{x},y)$ --, therefor.

In column 6, line 51, delete "x" and insert -- $\underline{x}$ --, therefor.

In column 6, line 51, delete "$\tilde{p}(x)$" and insert -- $\tilde{p}(\underline{x})$ --, therefor.

In column 9, line 1, delete "$\tilde{p}(x,y)$" and insert -- $\tilde{p}(\underline{x},y)$ --, therefor In column 9, line 2, delete "x" and insert -- $\underline{x}$ --, therefor.

In column 9, line 3, delete "$f_i(x,y)$" and insert -- $f_i(\underline{x},y)$ --, therefor.

In column 9, line 4, delete "$p_\Lambda(y|x)$" and insert -- $p_\Lambda(y|\underline{x})$ --, therefor.

In column 9, line 4, delete "$\tilde{p}(x)$" and insert -- $\tilde{p}(\underline{x})$ --, therefor.

Signed and Sealed this  
Twenty-sixth Day of July, 2011

David J. Kappos  
*Director of the United States Patent and Trademark Office*